United States Patent [19]

Trenkler et al.

[11] Patent Number: 4,507,639

[45] Date of Patent: Mar. 26, 1985

[54] INDUCTIVE POSITION SENSOR

[75] Inventors: George Trenkler, East Providence, R.I.; Lawrence E. Cooper, Attleboro, Mass.

[73] Assignee: Texas Instruments Incorporated, Dallas, Tex.

[21] Appl. No.: 494,154

[22] Filed: May 13, 1983

Related U.S. Application Data

[62] Division of Ser. No. 106,773, Dec. 26, 1979, Pat. No. 4,401,986.

[51] Int. Cl.$^3$ ............................................. H01F 21/04
[52] U.S. Cl. ...................................... 336/115; 336/118; 336/132
[58] Field of Search ............... 336/115, 117, 118, 134, 336/132, 135

[56]         References Cited
         U.S. PATENT DOCUMENTS 2,118,040  5/1938  Durkee et al. ................. 336/135 X
2,941,170  6/1960  McCoy ........................... 336/134 X Primary Examiner—A. D. Pellinen
Assistant Examiner—Susan Steward
Attorney, Agent, or Firm—James P. McAndrews; John A. Haug; Melvin Sharp

[57]        ABSTRACT

A non-contacting position sensor has an exciting coil in a plane and has a sensing coil in an intersecting plane so sensing coil portions are symmetrical around an exciting coil portion in mutually inductive relation to that portion of the exciting coil portions. A ferrite member magnetically shields those sensing coil portions from other portions of the exciting coil and a housing mount the sensor for relative movement with respect to magnetically permeable or electrically conductive inductance-modifier on an object whose position is to be monitored. Movement of the inductance-modifier as the object moves modifies mutual inductance between the respective sensing coil portions and the exciting coil portion so that, when the exciting coil is driven, the sensing coil provides a signal representative of the object position. If desired, an additional sensing coil is disposed in a third plane to provide X-Y position sensing. The inductive position sensor provides a reversal in output signal polarity when the object moves through a selected position where digital output may be required. The sensor regulates operating parameters of an automobile in response to change in position of an automotive component.

1 Claim, 8 Drawing Figures

INDUCTIVE POSITION SENSOR

This application is a division of application Ser. No. 106,773, filed Dec. 26, 1979, now U.S. Pat. No. 4,401,986.

BACKGROUND OF THE INVENTION

The field of this invention is that of non-contacting position sensors for use in control systems and the like. The invention particularly relates to an inductive position sensor and to an automotive control system using the inductive sensor for regulating operating parameters of the automobile in accordance with movement of an automotive member.

Many different types of non-contacting position sensors have been proposed for use in various different types of control systems for detecting the relative position of an object. Such sensing means are commonly arranged to provide output signals which are in some way representative of the object position and such outputs have typically been utilized for regulating some aspect of the control system. However, the sensor means have often been expensive, have tended to require special adaptation for each different type of use, and have frequently had operating characteristics which have prevented their use in automotive environments and the like. It is now proposed that various electronic controls utilizing microprocessors and the like be provided for regulating the operation of automobile engines and other automobile systems. For this purpose, it has been proposed that various types of position sensing means be arranged to provide inputs to the electronic controls representative of the position of the engine distributor or the crankshaft or the like.

In this regard, Hall effect position sensing means have been arranged relative to the engine distributor for providing a control signal to such microprocessor means representative of the instantaneous rotational position of the distributor during engine operation. The same Hall effect means have also been proposed for sensing the instantaneous position of rotation of the engine crankshaft. It has also been proposed that such Hall effect sensors be arranged in a fluid-adjustable shock absorber system to sense the shock-absorber position under load for regulating fluid supply to restore desired shock-absorber levels. Such Hall effect sensors are expensive. They appear to be somewhat unreliable for use in automotive environments.

In this regard, Hall effect position sensing means have been arranged for providing a control signal to such microprocessor means to be representative of the instantaneous rotational position of an engine distributor during automotive engine operation. Alternately, sensors incorporating a permanent magnet and a coil have been used for sensing the rotational position of an engine distributor or crankshaft or the like, the coupling between the magnet and coil being varied by rotating a ferromagnetic cam. Hall effect sensors tend to be expensive and appear to be somewhat unreliable for use in automotive environments; the coil-permanent magnet sensors tend to provide outputs which vary somewhat depending on the speed of rotation of the cam so that substantial tolerances are required; and any sensor incorporating a permanent magnet tends to accumulate magnetic dust particles and the like.

It is an object of this invention to provide a novel and improved non-contacting inductive position sensor; to provide such a sensor which is inexpensive to manufacture, which is conveniently mounted for use in determining position of an object, which is accurate and reliable in use, which provides an output independent of the rate of change position of the object whose position is being monitored, and which is adapted for use in automotive environments and the like. It is also an object of this invention to provide control systems for regulating operation of the system in accordance with movement of an object; to provide such a control system which regulates an operating a parameter of an automotive engine in response to change in position of a distributor or crankshaft as sensed by the said non-contacting inductive position sensing means; and to provide a control which regulates fluid supply to a fluid-adjustable shock absorber system in accordance with change in position of shock-absorbers in the system as sensed by said non-contacting inductive position sensing means.

SUMMARY OF THE INVENTION

Briefly decribed, the novel and improved non-contacting position sensor of this invention comprises an inductive exciting coil which is wound so that its convulsions fall in a first plane. The sensor also includes an inductive sensing coil which is wound so that its convulsions are disposed in a plane which intersects the first plane and so that corresponding portions of the sensing coil are symmetrically disposed on opposite sides of a portion of the exciting coil at a location where the sensing coil portions are in mutually inductive relation to said portion of the exciting coil. Preferably, magnetic shielding means are disposed between those portions of the sensing coil and other portions of the exciting coil. Preferably, for example, a sensing coil is wound in a selected plane of a reel which is then slipped into an annular cup-shaped ferrite member. The ferrite member is open at one end and has a ferrite post upstanding inside the member to fit up inside the center of the sensing coil. The exciting coil is then wound in an intersecting plane over the reel and the open and closed ends of the ferrite member. In that arrangement, two equal portions of the sensing coil are symmetrically disposed on opposite sides of the portion of the exciting coil which extends over the open ends of the ferrite member and are thereby located in mutually inductive relation to that part of the exciting coil. Those portions of the sensing coil are magnetically shielded from other portions of the exciting coil by the ferrite member.

Housing means then enclose the reel, ferrite member and coils and serve to conveniently mount the noted portions of the exciting and sensing coils so that they are easily disposed in close but non-contacting spaced relation to means for modifying mutual inductance between the coils. That is, the sensor housing permits the noted portions of the sensing and exciting coils to be located close to an object whose position is to be monitored so that magnetically permeable means of electrically conductive means carried by the object are adapted to modify mutual inductance between the coil portions as relative movement occurs between the object and the sensor. In that way, when the exciting coil is electrically driven, an output signal is induced in the sensing coil which is reliably and accurately representative of the relative position of the object and sensor. In one alternate embodiment of the invention, an additional sensing coil is disposed in a third plane for providing X-Y position sensing where desired.

In a preferred embodiment of the control system of this invention, the system includes electrically operable means such as electronic microprocessor means or the like for regulating an operating parameter of the system. Mutual inductance modifying means are then provided on an object in the system whose position is to be monitored. The sensor of this invention is then mounted adjacent to the inductance modifying means as above-described and means drive the exciting coil of the sensor so that the sensing coil provides an output signal representative of the object position for operating the regulating means in accordance with change in object position. In that way, the system is reliably and accurately regulated in accordance with the movement of the object in the system.

DESCRIPTION OF THE DRAWINGS

Other objects, advantages and details of the novel and improved position sensors and control systems of this invention appear in the following detailed description of preferred embodiments of the inventions, the detailed description referring to the drawings in which.

Figure 1:
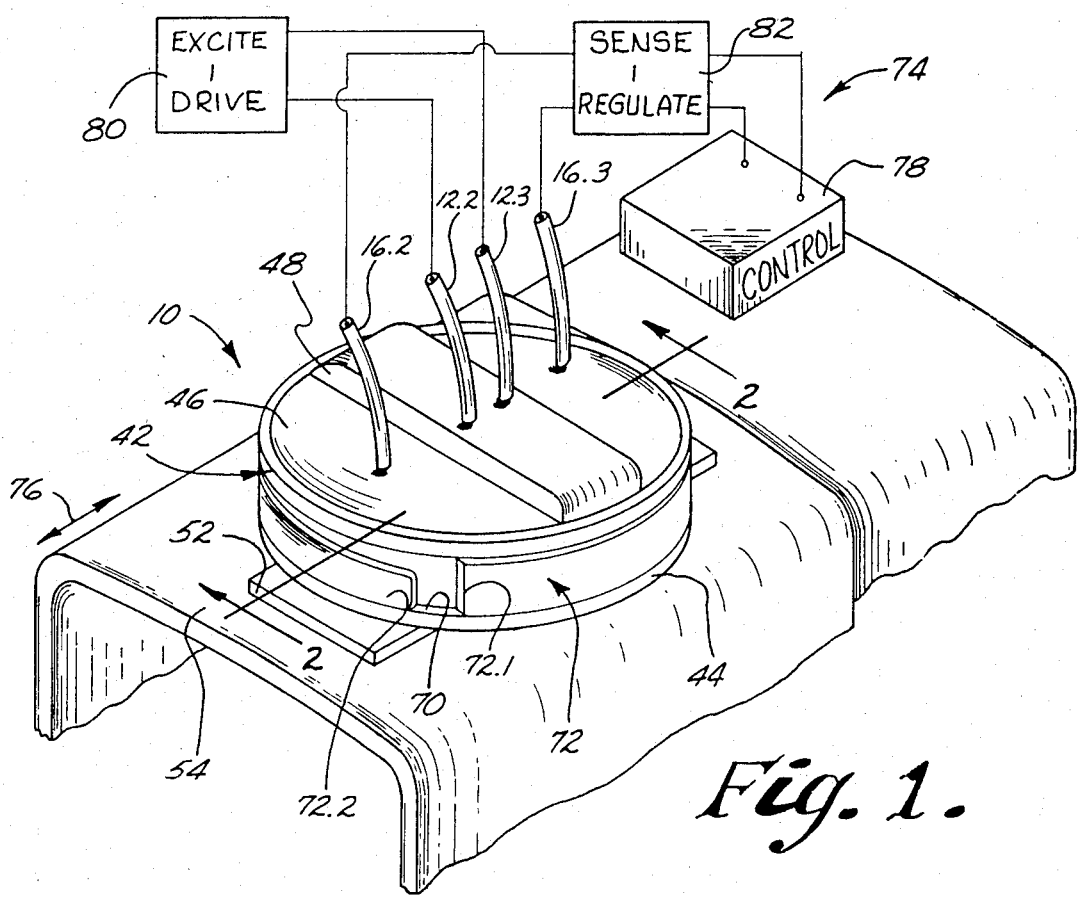
FIG. 1 is a perspective view of the novel and improved non-contacting inductive position sensor of this invention diagrammatically illustrating use of the sensor in a fluid-adjustable shock-absorber system for an automobile.
Figure 2:
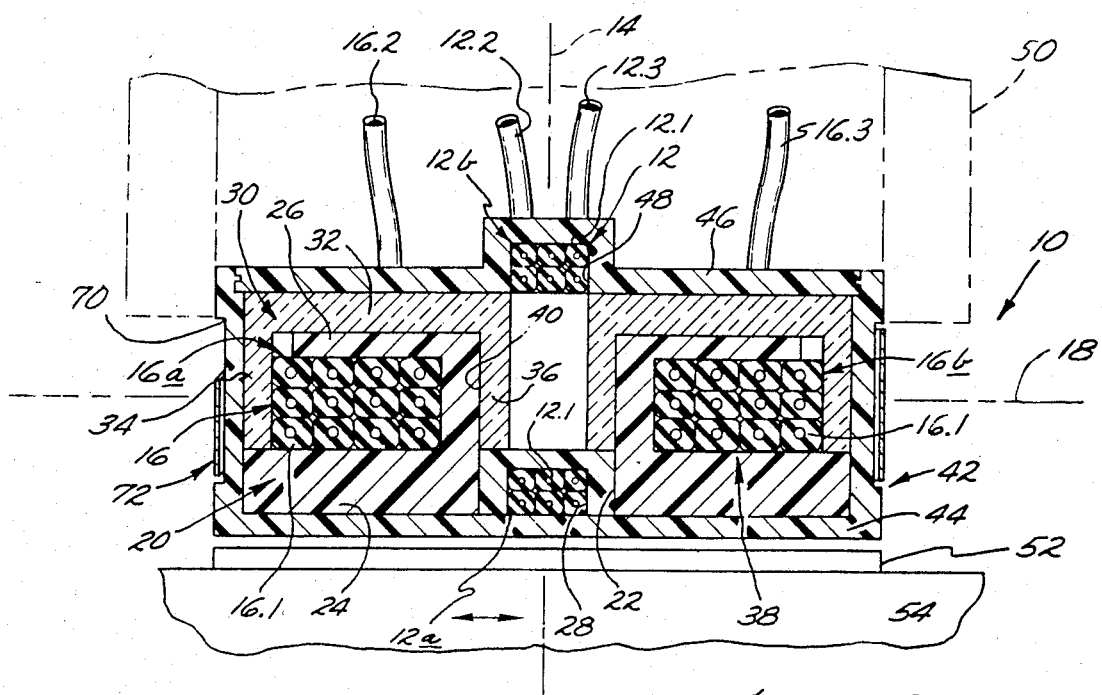
FIG. 2 is a section view to enlarged scale along line 2—2 of FIG. 1 schematically illustrating mounting of the sensor in a control system.

Referring to the drawings, 10 in FIGS. 1–5 indicates the novel and improved position sensor provided by this invention which is shown, particularly in FIG. 2, to include an exciting coil 12 which is wound so that the convolutions 12.1 of the coil are disposed in a first plane indicated in FIG. 2 by the broken line 14. The sensor 10 further includes a sensing coil 16 which is wound so that its convolutions 16.1 are disposed in a plane indicated 50 by the broken line 18 in FIG. 2 which intersects the first plane 14 and so that corresponding and preferably equal portions 16a, 16b of the sensing coil are symmetrically located at opposite sides of a portion 12a of the exciting coil in mutually inductive relation to that portion 12a of the exciting coil. Preferably, the sensing coil portions 16a, 16b are magnetically shielded from other portions of the exciting coil such as are indicated at 12b in FIG. 2 and at 12c, 12d in FIG. 3.

Preferably, for example, about 100–200 turns of #36 AWG magnet wire having an insulated coating thereon are wound on a core reel or bobbin 20 of polyethylene, glass filled nylone or other magnetically inactive material or the like to form the sensing coil 16 as above described. The reel preferably has a central opening 22, a large diameter flange 24, and a smaller diameter flange 26 as shown in FIG. 2. Preferably the reel also has a groove 28 in the larger diameter flange 24 which extends across the reel axis. The reel with the sensing coil 16 wound thereon is then disposed in an annular, generally cup-shaped member 30 of ferrite of other magnetic shielding material. Preferably, for example, the ferrite member comprises a commercially available, Series 1408 or Series 1411 member, commonly identified as a ferrite port coil, available from Ferroxcube Corp. having a bottom 32, a sidewall 34 upstanding from the perimeter of the bottom, and a tube or post 36 upstanding from the bottom in the center of the member the ferrite member having an open end 38 as shown in FIG. 2. The reel or bobbin 20 is then fitted into the ferrite member with the post 36 fitted into the reel opening 22 to extend up inside the sensing coil 16. The smaller reel flange is conveniently received in the ferrite chamber 40 while the larger reel flange 24 preferably closes off the open end 38 of the chamber 40 as shown in FIG. 2.

In the preferred embodiment of this invention, the exciting coil 12 is then wound with about 100-200 turns over the core reel 20 and the ferrite member 30 so that the exciting coil is disposed in plane 14 intersecting the plane 18 of the sensing coil, so that the portions 16a, 16b of the sensing coil are symmetrically disposed relative to the portion 12a of the exciting coil, so that the portion 12a of the exciting coil extends over the open end 38 of the ferrite member 30, so that exciting coil portion 12a is fitted into and retained in the groove 28 in the larger diameter flange 24 of the reel 20, and so that the ferrite member magnetically shields the sensing coil portions 16a, 16b from other portions of the exciting coil.

Housing means 42 for mounting, and preferably for enclosing the reel, ferrite and coils, are then provided in the sensor 10. Preferably for example, a generally cup-shaped housing 44 of polyethylene, flass-filled nylon or other magnetically inactive material is fitted over the reel and ferrite member and a housing cover 47 is snap-fitted or otherwise secured in the open end of the housing 44 for closing the housing, the cover preferably having a recess 48 for receiving the exciting coil portion 12b as is shown in FIG. 2. As will be understood, the reel flange 26, the ferrite member 30 and the cover 46 are provided with appropriate apertures (not shown) for permitting the ends 12.2, 12.3 and 16.2, 16.3 of the exciting and sensing coils to be led from within the housing in any conventional manner.

In accordance with this invention, the sensor 10 as above described is adapted to be mounted on any suitable support such as is diagrammatically indicated by the broken lines 50 so that the sensing coil portion 16a, 16b and the exciting coil portion 12a are easily disposed in close but non-contacting spaced relation to inductance modifying means 52 which are carried by an object 54 whose position is to be monitored by the sensor 10. That is, mutual inductance modifying means 52 which may be ferromagnetic means or the like of high magnetic permeability or electrically-conductive means whether ferromagnetic or not are provided on the object 54 closely adjacent to the noted exciting and sensing coil portions so that the means 52 affect the mutual inductance between each of the sensing coil portions 16a, 16b and the exciting coil portion 12a and so that relative movement between the modifying means 52 and those coil portions changes the mutual inductance between the coil portions. In that arrangement, when the exciting coil 12 is electrically driven in any conventional manner, an output signal is induced in the sensing coil portions which is representantive of the position of the object relative to the sensor 10.

Figure 3:
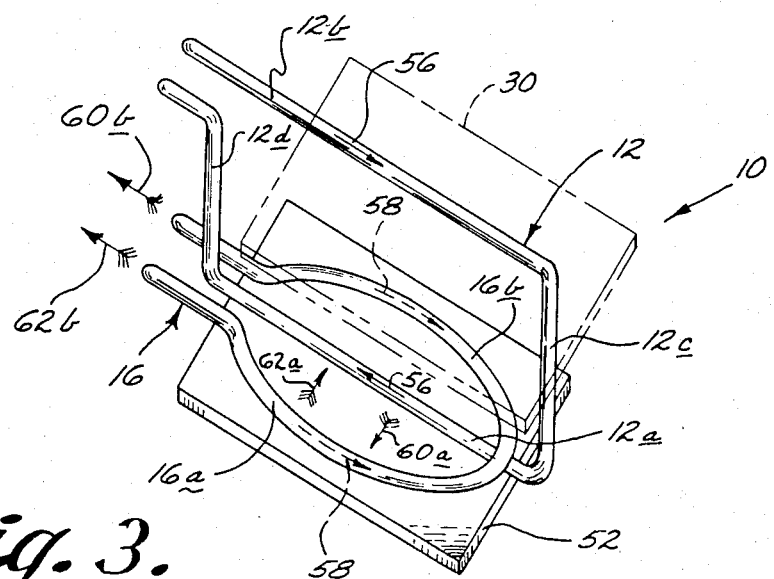
FIG. 3 is a diagrammatic perspective view illustrating principles of operation of the sensor of FIG. 1.

That is, as is shown in FIG. 3, when an electrical input is provided in the exciting coil 12 by any conventional electrical driving means as indicated by the arrows 56 in FIG. 3 while portion 12a of the exciting coil is in mutually inductive relation to the sensing coil portions 16a, 16b (and while those sensing coil portions are shielded from other portions 12b, 12c, 12d of the exciting coil by increased spacing from the sensing coil or by magnetic shielding means diagrammatically indicated at 30 in FIG. 3) electrical current tends to be induced in the sensing coil portions as is diagrammatically indicated by the arrows 58. However, where the sensing coil portions 16a, 16b are substantially equal and are symmetrically disposed relative to the exciting coil 12a as illustrated in FIG. 3, and where the mutual inductance modifying means 52 is centrally located as shown in FIG. 3, the mutual inductance between the exciting coil portion 12a and each of the sensing coil portions 16a, 16b tends to be equal but opposite so that no net output signal is provided by the sensing coil 16. However, if the mutual inductance modifying means comprises ferromagnetic means or the like and is moved in the direction indicated by the arrow 60a in FIG. 3 to increase mutual inductance between the exciting coil portion 12a and the sensing coil portion 16c, (and/or to reduce corresponding mutual inductance with the sensing coil portion 16b), a net output signal of a first polarity is induced in the coil 16 as indicated by the corresponding arrow 60b in FIG. 3. Conversely, if the modifying means 52 is moved in the opposite direction as indicated by the arrow 62a for producing an opposite modification between the noted coil portions, a net output signal of opposite polarity is induced in the sensing coil as indicated in FIG. 3 by the arrow 62b. Where there is a progressive change in mutual inductance due to relative movement of the sensor and the inductance modifying means 52, the amplitude of the output signal 60b reflects the degree of relative movement while the polarity of the signal reflects the direction of movement. Thus the sensor is adapted to be used either to provide an indication of the degree and direction of relative movement from the null position illustrated in FIG. 3 or to provide a digital indication of movement due to a change in polarity of the sensing coil output as the relative movement passes through the null point shown in FIG. 3.

As will be understood, the mutual inductance modifying means 52 comprises ferromagnetic means or the like which tend to enhance mutual inductance between the exciting coil portion 12a and one or both of the sensing coil portions 16a, 16b within the scope of this invention. Alternately, the modifying means 52 comprises electrically conductive means which provide eddy current damping of the mutual inductance between the exciting coil portion 12a and one or both of the sensing coil portions as will be understood. Further, it will also be appreciated that the mutual inductance modifying means 52 comprises a ferromagnetic or conductive member or the like which is attached to an object 54 whose position is to be monitored as shown in the drawings or alternately comprises a ferromagnetic or conductive portion of the monitored portion of the monitored object itself.

Figure 4:
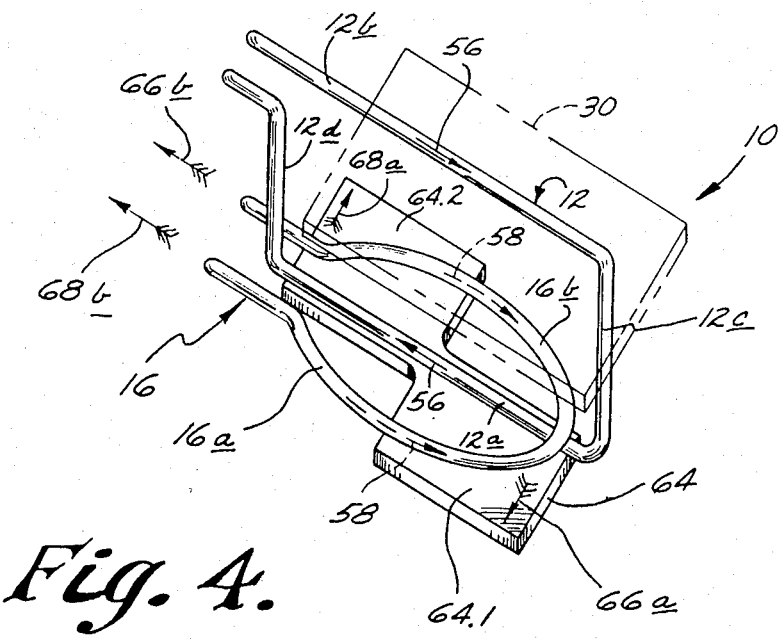
FIG. 4 is a diagrammatic view similar to FIG. 3 illustrating an alternate embodiment of the invention.

In a preferred embodiment of this invention as diagrammatically illustrated in FIG. 4, the mutual inductance modifying means 64 has separate portions 64.1, 64.2 which are secured to each other or the object to be monitored for common movement. However the separate portions are arranged so that they primarily effect the mutual inductance between the exciting coil portion 12a and a respective one of the sensing coil portions 16a, 16b. In that way, as can be seen by reference to FIG. 4, relative movement between the inductance modifying means 64 and the sensor as indicated by the arrows 66a, 68a tends to provide sharper and relatively more linear change in output signal amplitude for the sensing coil as is indicated by the corresponding arrows 66b, 68b because the degree of movement is more precisely related to the change in mutual inductance which is brought about by the movement.

In a particularly preferred embodiment of the position sensor 10, additional mean for modifying mutual inductance between the exciting coil portion 12a and the sensing coil portions 16a, 16b are provided in the sensors for calibrating the sensor. In a preferred structure for example, the housing member 44 is provided with a peripheral groove 70 and an additional inductance modifying means 72 is mounted for movement in the groove relative to the noted portions of the sensing and exciting coils. Typically, the modifying means 72 comprise a ring of conductive and preferably resilient material such as copper having a taper extending from part 72.1 of the ring around the ring periphery to the opposite end 72.2 so that the ring has a continously varying cross-section. The ring is preferably snapped into the groove 70 so that it can be rotated to a selected position in the groove and will retain that related position. The ring is proportioned and located relative to the sensing and exciting coil portion 16a, 16b and 12a so that rotation of the ring alters the relative mutual inductance between the exciting coil and the respective portions 16a, 16b of the sensing coil to adjust the sensing coil output to null or to another selected value within a selected range of adjustment. The ring is preferably arranged so it is loosely coupled to the sensing coil. Typically the ring is adapted to change inductance at the coil by not more than about 8–10%.

In a preferred embodiment of the novel and improved control system 74 of this invention, the mutual inductance modifying means 52 are provided on an object 54 such as a shock-absorber in a conventional fluid-adjustable automotive shock-absorber system. As will be understood, in such a conventional system, the shock absorber 54 is adapted to move as indicated by the arrow 76 in FIG. 1 in response to application or removal of a load to the shock absorber and electrically operable fluid pump means or the like such as are diagrammatically shown at 78 in FIG. 1 are actuable for furnishing more or less fluid to adjust the shock absorber position as the load is changed. As such a fluid-adjustable shock absorber system is conventional, it is not further described herein and it will be understood that when the shock absorber moves in one direction in response to increasing load, the pump means 78 is operable for increasing air or other fluid supply for restoring the shock absorber to its original position. Conversely, when the shock absorber moves in the opposite direction in response to a decrease in load, the pump means 78 is adapted to decrease fluid supply for again restoring the shock absorber to its original position. In accordance with this invention however, the sensor 10 is mounted in close but non-contacting relation to the inductance modifying means 52 and the exciting coil of the sensor is electrically driven by an conventional means diagrammatically illustrated at 80 in FIG. 1. In that arrangement, when the shock-absorber 54 is in its desired normal position under normal load, the sensing coil portions 16a, 16b are in corresponding mutually inductive relation to the exciting coil portion 12a so that the sensing coil does not provide an output signal to the pump means 78. However, if the load is changed so that there is relative movement between the shock-absorber and sensor, the sensing coil provides an output signal of appropriate amplitude and polarity to a conventional microprocessor control means or the like as shown at 82 in FIG. 1, thereby to actuate the pump means 78 for restoring the shock absorber to its original position.

Figure 5:
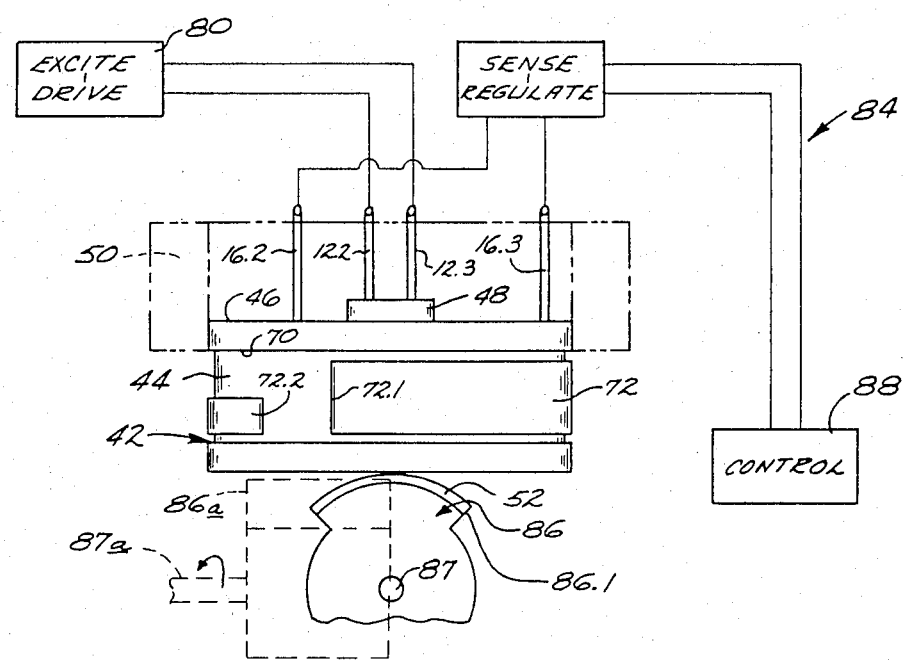
FIG. 5 is a side elevation view related to FIG. 2 illustrating use of the sensor of FIG. 1 in an alternate embodiment of the control system of this invention.

In another preferred embodiment 84 of the control system of this invention as shown in FIG. 5, the inductive modifying means 52 is mounted on a cam 86 to be rotated with an automotive engine distributor shaft or crankshaft as is indicated at 87 in FIG. 5. Where the sensor is arranged with the orientation between the cam and the sensing and exciting coils as shown in FIG. 5, the output signal provided by the sensor is adapted to reverse polarity each time a cam lobe or riser 86.1 passes through the central position shown in FIG. 5 as will be understood. Alternately, where the cam is reoriented 90° to the position indicated by the broken lines 86in FIG. 5, where the cam moves at one side of the center of the exciting coil, the output signal provided by the sensor varies in amplitude as the cam lobes pass the sensor. Conventional electronic microprocessor means or the like such as are diagrammatically illustrated at 88 in FIG. 5 are arranged for regulating operating parameters of the automotive engine in accordance with the instantaneous position of rotation of the distributor shaft or crankshaft. As the specific control system 88 can take many forms in various automotive applications it is not otherwise decribed. However, it will be understood that the control is of any conventional type. In accordance with this invention, however, the non-contact conductive position sensor 10 is mounted on a support 50 adjacent to the inductance modifying means 52 so that, when the exciting coil of the sensor is driven by conventional means 80 as the shaft 86 is rotated, the sensing coil of the sensor provides an output signal to the control 88 for regulating operating parameters of the control and of the automotive engine in response to the instantaneous position of shaft rotation.

Figure 6:
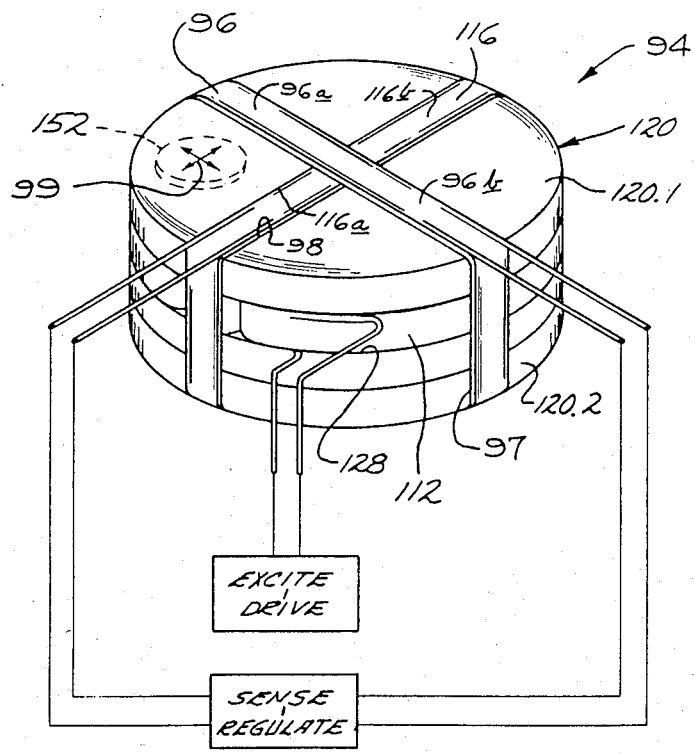
FIGS. 6–7 are perspective views of coil means used in alternate embodiments of the sensor of this invention.

Another embodiment of the sensor of this invention is illustrated at 94 in FIG. 6 in which components similar to the components of the sensor 10 are identified by corresponding numerals. In that alternate embodiment 94 of the invention, an additional sensing coil 96 is wound so that its convolutions are disposed in yet another plane which intersects the plane of the exciting coil 112 as well as the plane of a first sensing coil 116. Preferably for example, a cylindrical core reel or bobbon 120 is provided with a first polyethylene portion 120.1 and a second ferrite or magnetic shielding portion 120.2. A peripheral groove 128 is provided in the polyethylene portion adjacent to one end of the reel cylinder and two other grooves 97 and 98 extend longitudinally along and across the cylinder at 90° angles to each other as shown in FIG. 6. The exciting coil 112 is then wound in the peripheral groove 128 while the two sensing coils 96 and 116 are wound in the respective longitudinal grooves 97 and 98. In that arrangement, each of the sensing coils has portion 96a, 96b, and 116a, 116b, which are disposed symmetrically relative to the exciting coil 112. However, the ferrite portion 120.2 of the reel magnetically shields other portions of the sensing coils from the exciting coil. In that arrangement, the portions 96a, 96b and 116a, 116b of the sensing coils in mutually inductive relation to the exciting coil and accordingly, when the exciting coil is electrically driven in conventional manner as will be understood, output signals tend to be induced in each of the sensing coils. However, where the noted sensing coil portions are located symmetrically relative to the exciting coil and where mutual inductance modifying means are symmetrically located relative to the sensing coil portions as is indicated by the broken lines 152 in FIG. 6, no net output signal is provided by the sensing coils. However, where the inductance modifying means is moved in any direction in a plane as indicated by the arrows 99 in FIG. 6, the sensing coils provide outputs which are representative of the position of the inductance modifying means relative to the sensor 94. As will be understood, the outputs of the sensing coils 96 and 116 are adapted to be integrated in any conventional manner for provided a joy-stick type of control system or the like.

Figure 7:
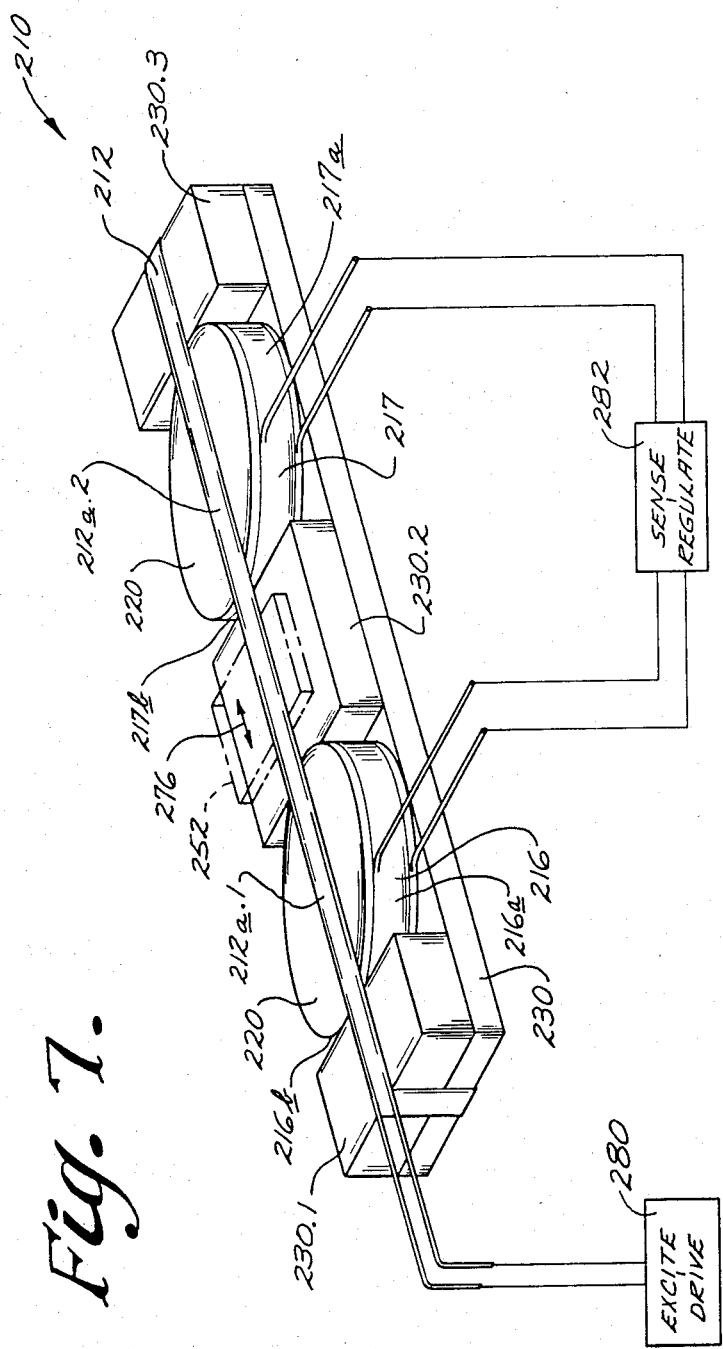

Another embodiment of this invention is shown at 210 in FIG. 7 in which components similar to the components of sensor 10 are identified by corresponding numerals. In that embodiment two sensing coils 216 and 217 are each wound so that their convolutions fall in a common plane, the coils preferably being wound on respective bobbins or reels 220 as shown in FIG. 7. The bobbins 220 are located on a ferrite support 230 with separate ferrite members 230.1, 230.2, 230.3 spaced around the bobbins for providing desired magnetic shielding. An exciting coil 212 is then wound over the ferrite members and bobbins as shown in FIG. 7 so that portions 216a, 216b 217a, 217b are symmetically disposed at either side of respective sections 212a.1, and 212a.2 of the exciting coil. The exciting coil is then driven in any conventional manner as indicated at 280 in FIG. 7 and a mutual inductance modifying means 252 is positioned asymmetrical with respect to the exciting coil 212 as shown in FIG. 3 but at a location where the inductance modifying means 252 is spaced equally relative to the sensing coils so that the net output from each sensing coils is zero. When the modifying means is then moved in either of the directions indicated by the arrows 276, one or the other of the sensing coils is adapted to modify the degree of mutual inductance between the exciting coil portion 212a.2 and one of the sensing coils so that the sensing coil provides an output to the regulating means 282, that output being representative of the position of the position of the modifying means 252 relative to the sensor 210 as will be understood.

Figure 8:
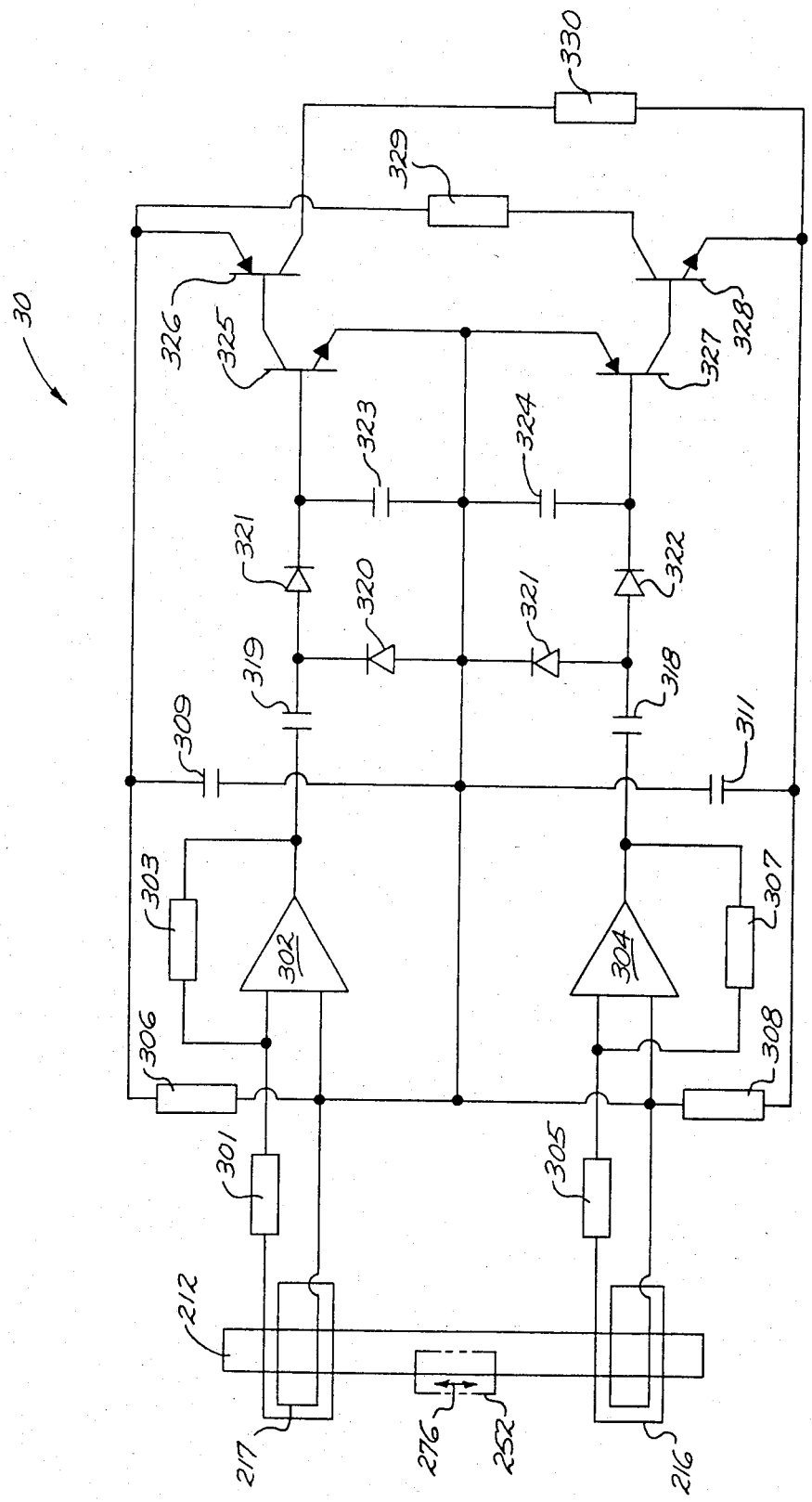
FIG. 8 is a schematic view of electronic control means used with the sensor shown in FIG. 7.

A preferred electronic control means for the sensor 210 is shown at 300 in FIG. 8, the exciting coil 212 being diagrammatically shown in mutually inductive relation to each of the sensing coils 216, 217 with the inductance modifying means 252 disposed asymmetrically with respect to the exciting coil 212 and equally spaced between the sensing coils. The resistor 301, 303 and 305, 307 establish the amplification ratios of the operational amplifiers 302, 304 respectively and the resistors 306, 308 from a voltage divider to establish a d.c. voltage level at ½ Vcc while the decoupling capacitors 309, 311 establish a.c. ground level. Capacitors 318, 319 couple the respective sensing coils to the rectifier circuits formed by the diodes, 202, 221, 223, 225 and filter capacitors 225, 226. The diodes establish a threshold level and when the inductance modifying means is in the position shown, that threshhold is typically not exceeded. However, when the modifying is moved in either direction indicated by arrow 276, mutual inductance between the sensing coil and one of the sensing coils provides an output of the current polarity for driving one of the transistors 227 or 228 which in turn drive one of the transistors 229 or 230. That is each half of the illustrated circuit sensors one of the sensing coils and is adapted to operate separate regulating means 231 or 232 corresponding to the direction of movement of the object whose position is being monitored.

It should be understood that although particular embodiments of the position sensors and system of this invention have been described in detail by way of illustrating the invention, this invention includes all modifications and equivalents of the described embodiments falling within the scope of the appended claims.

We claim:

1. A non-contact joy-stick type position sensor comprising an exciting coil having at least one convolution lying substantially in a first plane, one sensing coil having at least one convolution lying substantially in a second plane intersecting the first plane, said one sensing coil having a pair of portions of said convolution disposed substantially symmetrical relative to a portion of the exciting coil in mutually inductive relation to said exciting coil, and a second sensing coil having at least one convolution lying substantially in a third plane intersecting the first and second planes, said second sensing coil having a pair of portions thereof disposed substantially symmetrically relative to a portion of the exciting coil in mutually inductive relation to the exciting coil, said exciting and sensing coils being mounted relative to each other to be movable together relative to a mutual inductance modifying means on an object whose position is to be monitored for modifying the mutual inductance between said pairs of portions of each of said two sensing coils and said exciting coils during such relative movement so that, when the exciting coil is driven, the two sensing coils provide separate signals representative of the position of the object relative to the coils.

* * * * *